United States Patent [19]

Fukazawa

[11] Patent Number: 5,630,562
[45] Date of Patent: May 20, 1997

[54] WINDING METHOD AND APPARATUS FOR WOUND BALLS

[75] Inventor: Fumio Fukazawa, Chichibu, Japan

[73] Assignee: Bridgestone Sports Co., Ltd., Tokyo, Japan

[21] Appl. No.: 571,550

[22] Filed: Dec. 13, 1995

[30] Foreign Application Priority Data

Dec. 15, 1994 [JP] Japan .................................. 6-333476

[51] Int. Cl.$^6$ .................................................. B65H 54/64
[52] U.S. Cl. .................................................. 242/435.2
[58] Field of Search .................................. 245/435, 435.1, 245/435.2

[56] References Cited

U.S. PATENT DOCUMENTS

| | | | |
|---|---|---|---|
| 2,153,408 | 4/1939 | Bogoslowsky | 242/435 |
| 3,871,158 | 3/1975 | Puleo | 242/435 |
| 4,846,910 | 7/1989 | Brown | 242/435 |
| 4,921,177 | 5/1990 | Blust | 242/435.2 |
| 5,007,594 | 4/1991 | Brown | 242/435.1 |
| 5,133,509 | 7/1992 | Brown | 242/435.1 |

FOREIGN PATENT DOCUMENTS 51-126470 11/1976 Japan .
61-49985 10/1986 Japan .

*Primary Examiner*—Katherine Matecki
*Attorney, Agent, or Firm*—Sughrue, Mion, Zinn, Macpeak & Seas

[57] ABSTRACT

Rubber thread (5) is wound on a center (4) to form a wound core by grasping the center (4) with grasping fingers (23), locating the center (4) among rotatable winding rollers (12), securing a leading end of rubber thread (5) to the center surface by means of a capture finger (24), rotating in this state the center (4) together with the grasping and capture fingers (23 and 24), thereby winding the rubber thread on the center, bringing the winding rollers in pressure contact with the center surface through the rubber thread, thereby holding the center (4) and the rubber thread thereon by the winding rollers (12), withdrawing the grasping and capture fingers (23 and 24) from between the center (4) and the rubber thread (5), and driving the winding rollers (12) for rotating the center, thereby further winding the rubber thread on the center (4). The winding method can firmly secure the leading end to the center without a need for adhesive or water, and it can be fully automated.

9 Claims, 5 Drawing Sheets

WINDING METHOD AND APPARATUS FOR WOUND BALLS

BACKGROUND OF THE INVENTION

1. Field of the Invention

This invention generally relates to the manufacture of a wound ball, typically a wound golf ball comprising a core having rubber thread wound on a spherical center and a cover on the core. More particularly it relates to a method and apparatus for winding rubber thread on the center to form the wound core.

2. Prior Art

In general, wound golf balls are manufactured by winding rubber thread around a center, which is either a liquid center in the form of a rubber bag filled with a liquid or paste or a solid center made of solid rubber, to form a wound core, and enclosing the core with a cover.

It is a common practice to wind rubber thread on a center by holding the center among a plurality of rotatable winding rollers, feeding rubber thread to the surface of the center, and driving at least one of the winding rollers for rotation for thereby winding the rubber thread around the center. When rubber thread is to be wound on the center by this method, a leading end of rubber thread must be secured to the center at the start of winding. The following various techniques are known and used for securing the leading end to the center.

(1) Rubber thread is wound two or three turns on a center such that the leading end is interposed between the center surface and the turns of rubber thread, thereby fastening the leading end to the center.

(2) The leading end of rubber thread is placed on the surface of a center and adhesive is applied thereat to adhesively bond the leading end to the center surface. See Japanese Patent Publication (JP-B) No. 49985/1986.

(3) In the case of a liquid center, it is frozen before rubber thread is wound thereon. The leading end of rubber thread is placed on the surface of the frozen liquid center, and water is applied thereat. Then water is cooled and solidified whereby the leading end is tacked to the center surface. See Japanese Patent Application Kokai (JP-A) No. 126470/1976.

These leading end securing techniques, however, have the following problems. Technique (1) of binding rubber thread to the center is currently carried out by manual operation because of difficulty of automation. The manual binding operation is cumbersome and requires skill, contributing to a reduction of efficiency in the manufacture of wound golf balls.

The adhesive technique (2) has problems in that (i) after a droplet of the adhesive is applied, it is dried and cured over a certain time, (ii) due to tackiness of the adhesive, foreign matter is likely to adhere thereto, (iii) the winding apparatus is contaminated with the adhesive and its maintenance becomes cumbersome, (iv) the adhesive is not applicable to a liquid center because the liquid center is frozen before winding of rubber thread and the adhesive does not perform on the frozen center, and (v) the adhesive is eventually left in the ball to alter its performance.

The tacking technique (3) based on freezing of water has the problems that (i) solidification of water takes some time, (ii) water causes rust and dew in the winding apparatus, (iii) water adversely affects the winding apparatus, and (iv) application is limited to only liquid centers.

The prior art winding methods are not fully satisfactory with respect to efficient manufacture and quality reliability of products because many problems arise in securing the leading end of rubber thread to the center. There is a desire to have a winding method which can solve the problems associated with the start of rubber thread winding and produce wound golf balls of quality in an efficient manner.

SUMMARY OF THE INVENTION

Therefore, an object of the invention is to provide a method for winding rubber thread on a center for producing a wound ball, which method ensures easy and tight securing of the leading end of rubber thread to the center and enables full automation of the winding process without raising problems as found in the prior art.

Another object of the invention is to provide a winding apparatus capable of carrying out the winding method for winding rubber thread on a center in an automatic manner.

The present invention pertains to the manufacture of a wound ball comprising a core having thread rubber wound on a spherical center and a cover on the core.

In a first form, the present invention provides a method for winding thread rubber on the center to form the wound core, comprising the steps of:

grasping the center with a plurality of grasping fingers, locating the center among a plurality of rotatable winding rollers at a predetermined spacing from the rollers, securing a leading end of rubber thread to the surface of the center by means of a capture finger, rotating in this state the center at least one revolution together with the grasping fingers and the capture finger, thereby winding the rubber thread at least one turn on the center and over the grasping fingers and the capture finger, bringing the winding rollers in pressure contact with the surface of the center through the rubber thread while avoiding contact with the grasping fingers and the capture finger, thereby holding the center by the winding rollers and securing the rubber thread wound on the center, withdrawing the grasping fingers and the capture finger from between the center and the rubber thread, and drivingly rotating at least one of the winding rollers for rotating the center, thereby further winding the rubber thread on the center.

In a second form, the present invention provides an apparatus for winding thread rubber on the center to form the wound core, comprising winding means including a plurality of rotatable winding rollers which are supported for motion toward and away from each other and for rotation about their axis, a center hand including an arm opposed to the winding rollers and mounted for linear motion toward and away from the winding rollers and rotation about its axis, a plurality of grasping fingers provided at the distal end of the arm for grasping the center, and a capture finger provided at the distal end of the arm for securing a leading end of rubber thread to the surface of the center, and a rubber thread hand capable of gripping the leading end of rubber thread and guiding the leading end to the surface of the center grasped by the grasping fingers, wherein the winding means is operable such that while the center is held by the winding rollers, at least one of the winding rollers is driven for rotation to rotate the center for winding the rubber thread on the center.

More particularly, according to the winding method of the invention, the center is grasped with a plurality of grasping fingers and located among a plurality of rotatable winding rollers at a predetermined spacing from the rollers. A leading end of rubber thread is secured to the surface of the center by means of a capture finger. In this state, the center is rotated at least one revolution together with the grasping fingers and the capture finger, whereby the rubber thread is wound at least one turn on the center and over the grasping fingers and the capture finger. That is, the rubber thread is wound on the center while binding the grasping and capture fingers beneath it.

Next, the winding rollers are contacted under pressure with the surface of the center through the rubber thread turn(s). Any contact of the winding rollers with the grasping and capture fingers should be avoided. As a result, the center is held or supported by the winding rollers, and the rubber thread turn(s) wound on the center is secured by the winding rollers. The grasping and capture fingers are withdrawn from between the center and the rubber thread turn(s). The rubber thread turn(s) is kept wound on the center since the rubber thread turn(s) is interposed and tightly held between the winding rollers and the center surface. It never happens that the rubber thread turn(s) is separated from the center together with the grasping and capture fingers at the same time when the grasping and capture fingers are withdrawn from between the center and the rubber thread turn(s). This results in the state that the center having one or more turns of rubber thread wound thereon is supported by the winding rollers.

In this state, it is desirable that the leading end of rubber thread is clamped between the center and the rubber thread turn(s) wound thereon. The clamping of the leading end by the subsequent rubber thread turn(s) can be easily accomplished if the leading end of rubber thread is obliquely (with respect to the winding direction) oriented when the leading end is tacked to the center by the capture finger. However, the winding method of the invention is not limited to this embodiment. Since the rubber thread turn(s) wound on the center is interposed and tightly held between the winding rollers and the center surface as mentioned above, the rubber thread turn(s) is not detached from the center even if the leading end of rubber thread is not clamped between the center and the rubber thread turn(s) wound thereon. Therefore, the invention ensures to start winding rubber thread whether or not the leading end of rubber thread is clamped between the center and the rubber thread turn(s) wound thereon.

From the state that the center having one or more turns of rubber thread wound thereon is supported by the winding rollers, at least one of the winding rollers is driven for rotation for rotating the center while continuously feeding the rubber thread. Then the rubber thread is uniformly wound on the center until a wound core is completed.

The winding method of the invention can firmly secure the leading end of rubber thread to the center without a need for adhesive or water. The securing step can be carried out by a simple procedure in an easy manner within a short time. The method is not detrimental to the winding apparatus. The method is equally effectively applicable to both solid centers and liquid centers. Attachment of the thread leading end to the center can be accomplished by the simple steps of guiding the leading end of rubber thread to the surface of the center supported by the grasping fingers, tacking the leading end to the center surface by the capture finger, and rotating the center together with the grasping and capture fingers, whereby the leading end of rubber thread can be secured to the center in a short time without cumbersome operation before winding operation is started. This step of tacking the leading end of rubber thread to the center can be fully automated by using the thread hand for clamping the leading end of rubber thread and guiding it to the surface of the center in an automatically controlled manner and the center hand having the grasping fingers and the capture finger and capable of operating the fingers in an automatically controlled manner.

The winding apparatus of the invention includes the rubber thread hand and the center hand and carries out the step of securing the leading end of rubber thread to the center and the step of winding the rubber thread on the center in an automatic manner according to the method of the invention. The apparatus is operated to wind rubber thread on the center by grasping the center with the grasping fingers of the center hand, locating the center among the winding rollers at a predetermined spacing from the rollers, guiding a leading end of rubber thread to the surface of the center by means of the thread hand, securing the leading end to the center surface by means of the capture finger of the center hand, rotating in this state the center at least one revolution together with the grasping and capture fingers, thereby winding the rubber thread at least one turn on the center and over the grasping and capture fingers, moving the winding rollers toward each other to bring the winding rollers in pressure contact with the center surface through the rubber thread, thereby holding the center by the winding rollers and securing the rubber thread wound on the center by the winding rollers, retracting the center hand to withdraw the grasping and capture fingers from between the center and the rubber thread, and drivingly rotating at least one of the winding rollers for rotating the center, thereby further winding the rubber thread on the center in an automatic manner.

In this way, the winding apparatus of the invention carries out the rubber thread leading end securing step and the winding step in an automatic manner according to the winding method of the invention.

BRIEF DESCRIPTION OF THE DRAWINGS

These and further features of the present invention will be apparent reference to the following description and drawings, wherein.

DETAILED DESCRIPTION OF THE INVENTION

Figure 1A:
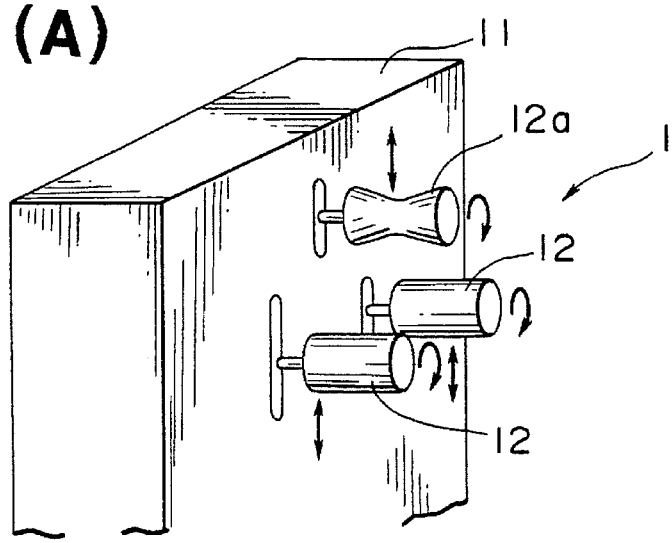
FIGS. 1(A), 1(B), and 1(C) are schematic views of main sections of a rubber thread winding apparatus, FIG. 1(A) illustrating a winding means, FIG. 1(B) illustrating a center hand, and FIG. 1(C) illustrating rubber thread hand.
Figure 1B:
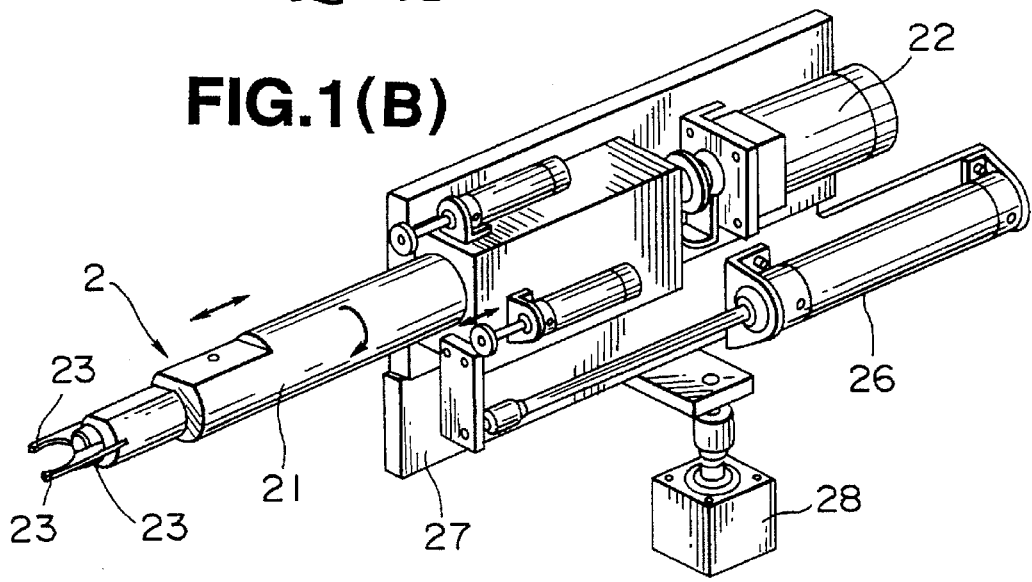
Figure 1C:
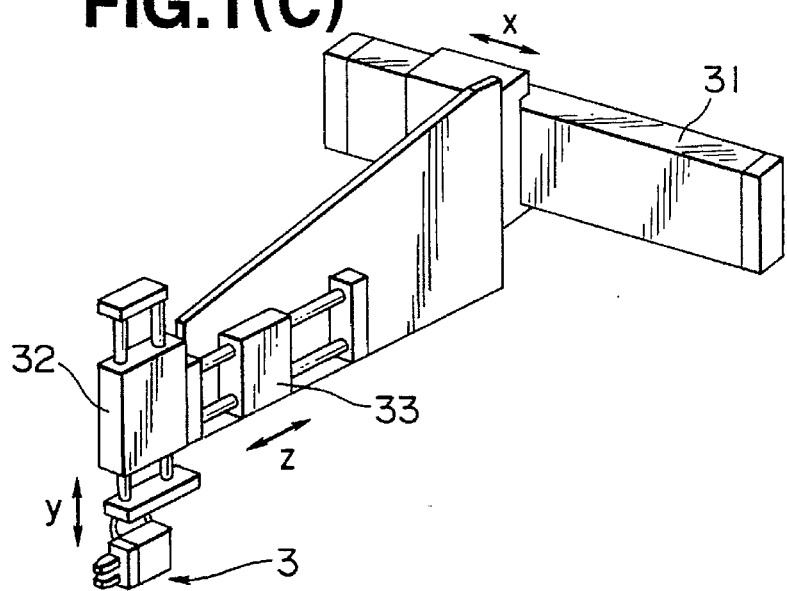
Figure 2:
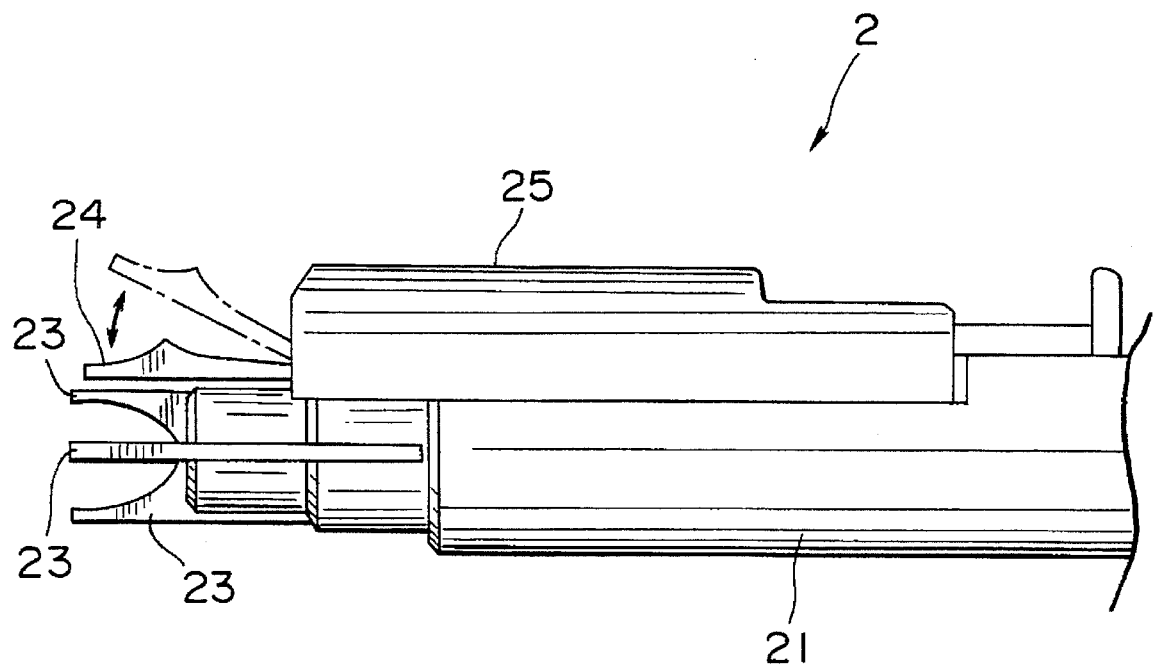
FIG. 2 is an enlarged side view of a distal portion of the center hand.

Referring to FIGS. 1 and 2, there is illustrated a winding apparatus according to one embodiment of the invention. The winding apparatus includes a winding means 1 shown in FIG. 1A, a center hand 2 shown in FIG. 1B, and a rubber thread hand 3 shown in FIG. 1C. By operating the winding means 1, center hand 2 and thread hand 3 in unison, the winding apparatus produces a wound core for a wound golf ball according to the winding method of the invention.

As shown in FIG. 1A, the winding means 1 includes a main frame 11 having a drive mechanism and a control mechanism (not shown) received therein, two cylindrical winding rollers 12, 12 and an hourglass winding roller 12a. The rollers 12, 12, 12a are arranged at the apexes of a triangle on a front side of the main frame 11 and rotatably supported on drive shafts. The hourglass winding roller 12a which is tapered toward the axial center from opposite ends is disposed vertically above the horizontally arranged rollers 12. Under the control of the drive and control mechanisms in the frame 11, the cylindrical winding rollers 12, 12 can be driven for rotation about their axis and moved back and forth along their axis whereby the center is rotated in a continuously varying direction so that thread rubber may be uniformly wound on the center. The hourglass roller 12a is vertically movable toward and away from the cylindrical winding rollers 12, 12 so that the center or wound core may be loaded between or unloaded from the winding rollers. The hourglass roller 12a is gradually moved upward as the wound core increases its diameter during thread rubber winding.

As shown in FIG. 1B, the center hand 2 includes a drive motor 22 and an arm 21 in the form of a round rod adapted to be driven for rotation about its axis by the motor 22. The arm 21 is provided with three grasping fingers 23, 23, 23 which project from the distal end of the arm 21 and are adapted to open and close. Though not shown in FIG. 1B, the arm 21 at its distal end is also provided with a securing unit 25 including a swingable capture finger 24 as shown in FIG. 2. The fingers are operated by an automatic control system (not shown). More particularly, the grasping fingers 23, 23, 23 are adapted to move their tip ends toward and away from each other to open and close (shown as closed in FIG. 2). The capture finger 24 is adapted to swing toward and away from the grasping fingers 23 as shown by solid and broken lines in FIG. 2.

The center hand 2 is mounted for linear motion on a guide rail 27 so that the hand 2 is moved back and forth perpendicular to the front side of the frame 11 by means of a drive cylinder 26. The rail 27 is coupled to a swing mechanism 28 so that the hand 2 is swingable.

Though not shown, the center hand 2 is disposed so as to face the winding rollers 12, 12, 12a of the winding means 1. When the arm 21 is moved forward, the grasping fingers 23 and capture finger 24 are positioned among the winding rollers 12, 12, 12a, at the center of the triangle defined thereby (that is, at the operative position). When the arm 21 is moved backward, the grasping fingers 23 and capture finger 24 are retracted from the operative position among the winding rollers 12, 12, 12a. Through the linear and swing motions of the arm 21, a center fed from an appropriate center feed mechanism is grasped by the grasping fingers 23, 23, 23 and positioned at the operative position among the winding rollers 12, 12, 12a.

As shown in FIG. 1C, the rubber thread hand 3 includes a head having a pair of beaks adapted to be opened and closed under automatic control. The head is movable in three orthogonal directions, laterally in x direction along a guide rail 31, up and down in y direction by means of a cylinder 32, and back and forth in z direction by means of a cylinder 33.

Though not shown, the thread hand 3 is disposed to face the front side of the frame 11. While the thread hand 3 is moved in x, y and z directions in a controlled. manner, it grips a leading end of a rubber thread unraveled from an appropriate rubber thread supply and guides the leading end to the operative position among the winding rollers 12, 12, 12a.

Next, the operation of the winding apparatus is described. It is noted that all the above-mentioned components are operated in unison by an automatic control system.

Figure 3A:
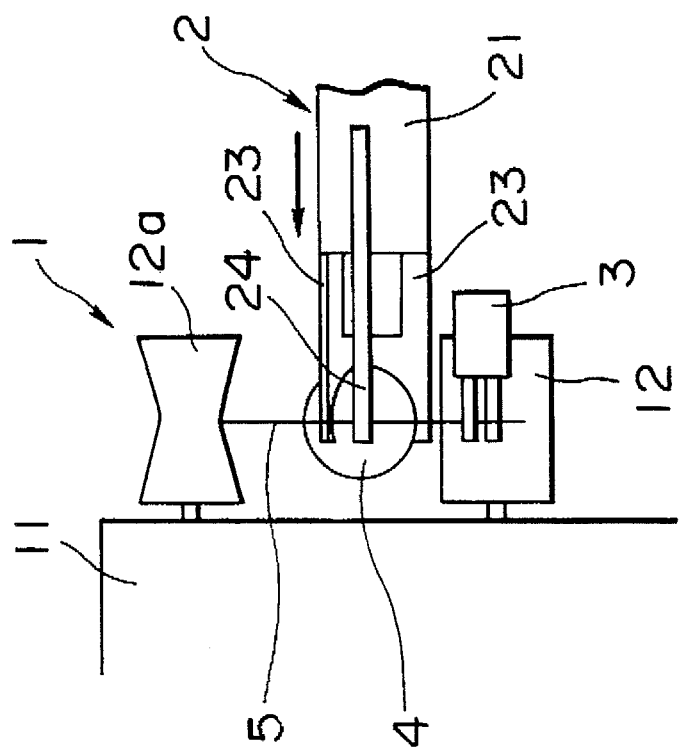
FIGS. 3(A) and 3(B) illustrate the first step in the thread winding method of extending the leading end of rubber thread to the center, FIG. 3(A) being a schematic side view and FIG. 3(B) being a schematic front view.
Figure 3B:
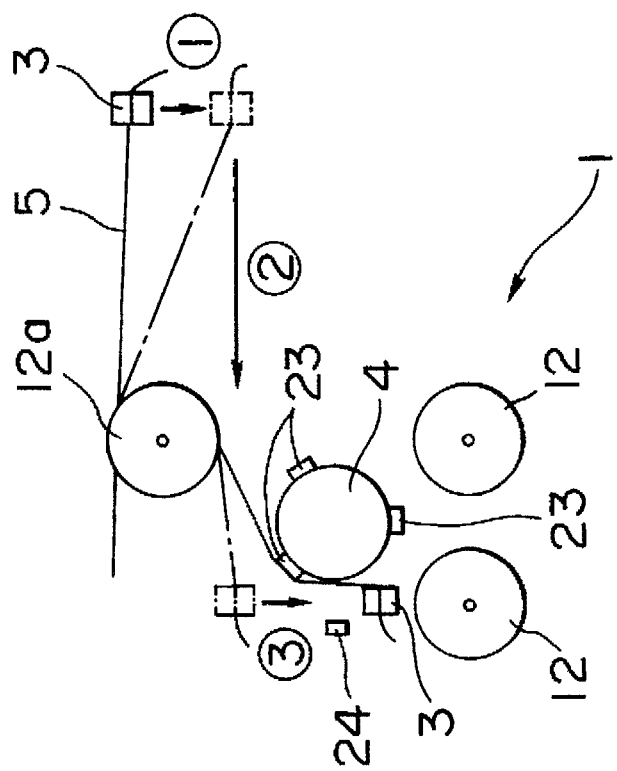

A rubber thread is wound on a center to form a (wound) core for a wound golf ball by means of the winding apparatus. First, a center 4 fed from an appropriate center feed mechanism (not shown) is grasped by the grasping fingers 23, 23, 23 of the center hand 2 and located at the operative position among the winding rollers 12, 12, 12a as shown in FIG. 3A and 3B. The center 4 is spaced a predetermined distance from the rollers 12, 12, 12a.

A leading end of a rubber thread 5 unraveled from an appropriate rubber thread supply (not shown) is gripped by the thread hand head 3. As shown in FIG. 3B, the thread leading end is passed above the winding roller 12a from the left to right. The thread hand head 3 is moved in the order of arrows 1, 2 and 3 (circled) as shown in FIG. 3B and then inside the capture finger 24 with respect to the center 4. In this way, the thread leading end is led to the surface of the center 4 located at the operative position among the winding rollers 12, 12, 12a.

Figure 4C:
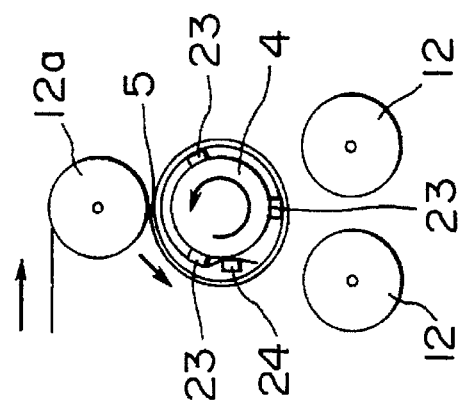
FIGS. 4(A), 4(B), and 4(C) illustrate the second step in the thread winding method, FIG. 4(A) being a schematic side view, FIG. 4(B) being a schematic front view, and FIG. 4(C) being a schematic front view after the center hand is rotated to wind the thread around the center.
Figure 4B:
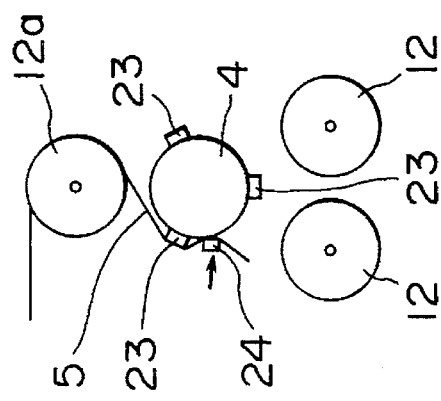
Figure 4A:
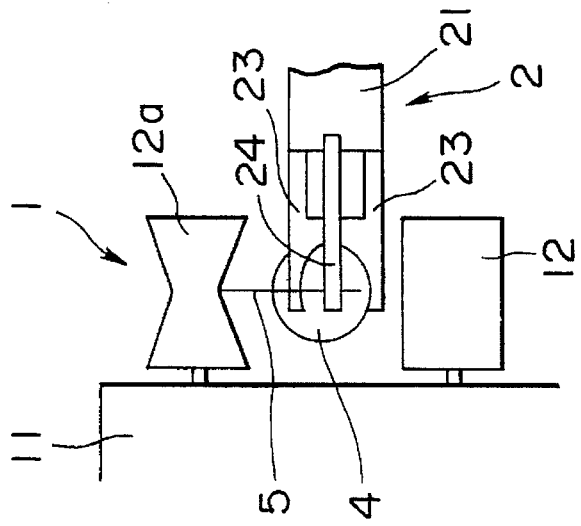

In this state, the capture finger 24 is brought into pressure contact with the surface of the center 4 through the rubber thread 5 as shown in FIGS. 4(A) and 4(B). The leading end of rubber thread 5 is fixedly secured to the surface of the center 4 by the capture finger 24. At this point, the thread hand head 3 releases the thread leading end and is retracted. As shown in FIG. 4C, the center hand 2 is rotated about its axis to rotate the center 4 at least one revolution (two revolutions in FIG. 4C) together with the grasping fingers 23, 23, 23 and the capture finger 24. The rubber thread 5 is wound at least one turn (two turns in FIG. 4C) around the center 4 and over the grasping fingers 23, 23, 23 and the capture finger 24. The rubber thread 5 is wrapped around the center 4 with the grasping fingers 23, 23, 23 and the capture finger 24 being interposed between the center 4 and the thread 5.

Figure 5A:
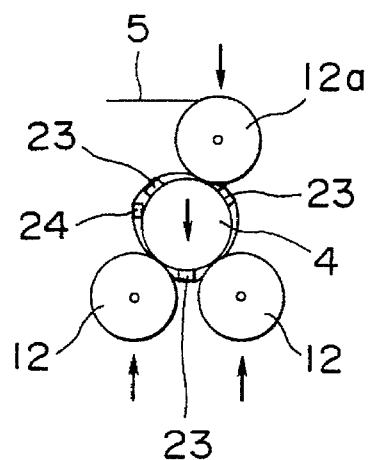
FIGS. 5(A) and 5(B) illustrate the third step in the thread winding method, FIG. 5(A) being a schematic front view and FIG. 5(B) being a schematic side view.
Figure 5B:
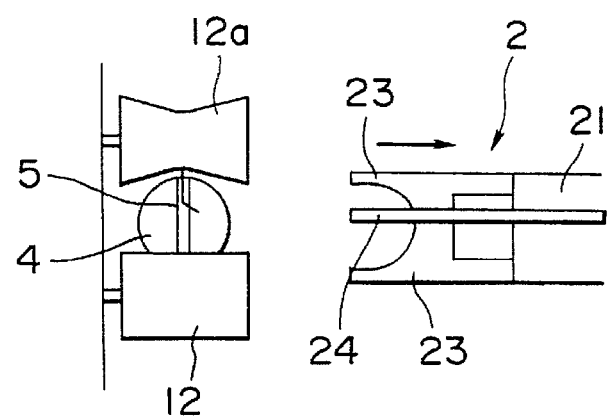

Next, the winding rollers 12, 12, 12a are moved toward each other until they contact the center 4. As shown in FIG. 5(A), the winding rollers 12, 12, 12a are brought in pressure contact with the surface of the center 4 through the rubber thread 5 while avoiding direct contact with the grasping fingers 23 and the capture finger 24. As a consequence, the center 4 is supported among the winding rollers 12, 12, 12a and the rubber thread 5 wound on the center 4 is secured by the winding rollers 12, 12, 12a. At this point, the center hand 2 is retracted to withdraw the grasping fingers 23, 23, 23 and capture finger 24 from the operative position among the winding rollers 12, 12, 12a, that is, from between the center 4 and the rubber thread 5 as shown in FIG. 5(B). Even after the grasping fingers 23, 23, 23 and capture finger 24 are withdrawn from between the center 4 and the rubber thread 5, the thread rubber 5 is held wrapped on the center 4. Since the rubber thread 5 is interposed between the winding rollers 12, 12, 12a and the surface of the center 4, the rubber thread 5 is not carried off the center 4 surface together with the retracting fingers 23, 24. As a consequence, the center 4 having the rubber thread 5 wrapped one or several turns (two turns in the illustrated embodiment) therearound is held among the winding rollers 12, 12, 12a.

Figure 6A:
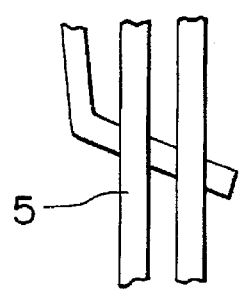
FIGS. 6(A) and 6(B) illustrate the arrangement of the leading end an subsequent turns of rubber thread wound according to the invention, FIG. 6(A) showing the leading end clamped by the subsequent turns and FIG. 6(B) showing the leading end kept loose.
Figure 6B:
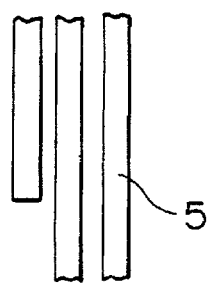

According to the winding method of the invention, the rubber thread 5 wound on the center 4 is interposed between the respective winding rollers 12, 12, 12a and the surface of the center 4. This permits the leading end of rubber thread 5 to be either clamped between the center 4 and the rubber thread 5 turns subsequently wound thereon as shown in FIG. 6A or not as shown in FIG. 6B. That is, the leading end of rubber thread may be either clamped or loose. Even when the leading end of rubber thread is loose as shown in FIG. 6B, the rubber thread 5 is not separated from the center 4, ensuring to start to effectively wind the succeeding rubber thread 5.

In the state that the center 4 having one or several turns (two turns in the illustrated embodiment) of the rubber thread 5 wound thereon is held among the winding rollers 12, 12, 12a, while the rubber thread 5 is continuously fed, the two cylindrical winding rollers 12, 12 are driven for rotation to turn round the center 4, thereby uniformly winding the rubber thread 5 on the center 4. The thread winding technique used herein may be any of well-known winding techniques including random winding and great circle winding techniques. Thread winding can be carried out by controlledly driving the winding rollers 12, 12 for rotation in a well-known manner.

The winding method and apparatus according to the invention enables securing the leading end of rubber thread 5 to the center 4 without a need for adhesive or water. This achieves brief attachment of the thread leading end to the center and eliminates the detrimental influence of adhesive or water on the winding apparatus or center. The invention is effectively applicable whether the center 4 is a solid center or a liquid center. Attachment of the thread leading end to the center can be accomplished by the simple steps of guiding the leading end of rubber thread 5 to the surface of the center 4 supported by the grasping fingers 23, 23, 23, securing the leading end to the center 4 surface by the capture finger 24, and rotating the center 4 together with the grasping and capture fingers 23 and 24, whereby the leading end of rubber thread 5 can be secured to the center 4 in a short time without cumbersome operation before winding operation is started. The winding apparatus of the invention includes the thread hand 3 for gripping the leading end of rubber thread 5 and guiding it to the surface of the center 4 in an automatically controlled manner and the center hand 2 having the grasping fingers 23, 23, 23 and the capture finger 24 and capable of operating the fingers 23 and 24 in an automatically controlled manner, the step of securing the leading end of rubber thread can be fully automated.

The winding method and apparatus according to the invention are not limited to the illustrated embodiment. For example, although the step of guiding the leading end of rubber thread 5 to the surface of center 4 is carried out in an automatically controlled manner by means of the thread hand 3 and the step of securing the leading end to the surface of center 4 by the capture finger 24 and the step of rotating the center 4 together with the grasping and capture fingers 23 and 24 to wind the rubber thread several turns are carried out in an automatically controlled manner by means of the center hand 2 in the illustrated embodiment, these steps may be manually carried out. Even with manual operation, the leading end of rubber thread 5 can be secured to the center 4 by a very simple operation as compared with the prior art, without a need for adhesive or water. Also, the number, shape and control system of the winding rollers 12, grasping and capture fingers 23 and 24, and thread hand 3 may be appropriately altered. With respect to the remaining members, modifications may be made without departing from the scope of the invention. Although the winding method and apparatus according to the invention are advantageously applicable to the manufacture of wound cores of wound golf balls, the invention can also be applicable to other applications other than the wound golf balls as long as they are wound balls including a core having rubber thread wound on a center. For example, the invention is applicable to the manufacture of wound cores for baseballs.

There has been described a winding method which can secure the leading end of rubber thread to the center without a need for adhesive or water. The securing step can be carried out by a simple procedure in an easy manner. The rubber thread winding operation can be fully automated without the problems raised in the prior art. The winding apparatus of the invention can automatically carry out the step of securing the leading end of rubber thread and the subsequent winding step according to the winding method of the invention.

Although some preferred embodiments have been described, many modifications and variations may be made thereto in the light of the above teachings. It is therefore to be understood that within the scope of the appended claims, the invention may be practiced otherwise than as specifically described.

I claim:

1. A method for making a wound core for a wound ball having a core with a rubber thread wound on a spherical center and a cover on the core, comprising the steps of:

grasping the center with a plurality of grasping fingers, locating the center among a plurality of rotatable winding rollers at a predetermined spacing from the rollers, securing a leading end of said rubber thread to the surface of said center by means of a capture finger, rotating the center at least one revolution together with the grasping fingers and the capture finger, thereby winding the rubber thread at least one turn on the center and over the grasping fingers and the capture finger, bringing the winding rollers in pressure contact with the surface of the center through the rubber thread while said winding rollers avoid contact with the grasping fingers and the capture finger, thereby holding the center by the winding rollers and securing the rubber thread wound on the center by the winding rollers, withdrawing the grasping fingers and the capture finger from between the center and the rubber thread, and drivingly rotating at least one of said winding rollers for rotating the center, thereby further winding the rubber thread on the center.

2. An apparatus for winding a rubber thread on a center to form a wound core to be disposed in a wound ball comprising:

winding means including a plurality of rotatable winding rollers which are supported for motion toward and away from each other and for rotation about their axis, a center hand including an arm opposed to the winding rollers and mounted on means for linear motion toward and away from the winding rollers and rotation about its axis, a plurality of grasping fingers provided at the distal end of the arm for grasping the center, and a capture finger provided at the distal end of the arm for securing a leading end of he rubber thread to the surface of the center, a rubber thread hand for gripping the leading end of rubber thread and for guiding the leading end to the surface of the center grasped by the grasping fingers, and means for rotating said winding rollers, whereby said winding means is operable such that while the center is held by the winding rollers, at least one of the winding rollers is driven for rotation to rotate the center for winding the rubber thread on the center.

3. The apparatus of claim 2 wherein said center hand further comprises a drive motor and said arm is a rod rotatable by said motor.

4. The apparatus of claim 2 wherein said plurality of fingers comprises three grasping fingers, said grasping fingers adapted to move tip ends thereof toward and away from each other to open and close.

5. The apparatus of claim 2 wherein said capture finger is mounted to swing toward and away from said grasping fingers.

6. The apparatus of claim 2 wherein said means for linear motion of said center hand comprises a guide rail upon which said center hand is mounted and a drive cylinder to move said center hand on said guide rail.

7. The apparatus of claim 6 further comprising a rotatable mount for said guide rail, and a swing mechanism coupled to said guide rail to swing said center hand.

8. The apparatus of claim 2 wherein said rubber thread hand comprises a head having a pair of beaks adapted to open and close.

9. The apparatus of claim 2 further comprising means to move said rubber thread hand in three orthogonal directions.

* * * * *